(12) United States Patent
Pande et al.

(10) Patent No.: US 7,688,716 B2
(45) Date of Patent: Mar. 30, 2010

(54) METHOD, APPARATUS, AND SYSTEM FOR IMPROVING ETHERNET RING CONVERGENCE TIME

(75) Inventors: Moni Pande, San Jose, CA (US); Jie Cheng Jiang, Foster City, CA (US); Navindra Yadav, San Jose, CA (US); Gnanaprakasam Pandian, Cupertino, CA (US); Pauline Shuen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 941 days.

(21) Appl. No.: 11/120,668

(22) Filed: May 2, 2005

(65) Prior Publication Data
US 2006/0245351 A1    Nov. 2, 2006

(51) Int. Cl.
*H04L 12/26*    (2006.01)
(52) U.S. Cl. ...................................... 370/222
(58) Field of Classification Search ................. 370/216, 370/217, 221, 225, 242, 243, 244, 245, 218, 370/219, 220, 222, 223, 224, 236, 237
See application file for complete search history.

(56) References Cited

U.S. PATENT DOCUMENTS

| 4,713,807 | A   |   | 12/1987 | Caves et al. |   |
|---|---|---|---|---|---|
| 5,282,200 | A   |   | 1/1994  | Dempsey et al. |   |
| 6,766,482 | B1  | * | 7/2004  | Yip et al. | 714/717 |
| 6,788,681 | B1  |   | 9/2004  | Hurren et al. |   |
| 7,003,705 | B1  | * | 2/2006  | Yip et al. | 714/717 |
| 2003/0048746 | A1 | * | 3/2003  | Guess et al. | 370/219 |
| 2004/0143755 | A1 | * | 7/2004  | Whitaker et al. | 713/200 |
| 2004/0223503 | A1 |   | 11/2004 | Lynch et al. |   |
| 2005/0015470 | A1 | * | 1/2005  | de Heer et al. | 709/221 |
| 2005/0207348 | A1 | * | 9/2005  | Tsurumi et al. | 370/241 |

OTHER PUBLICATIONS

US/ISA, International Search Report and Written Opinion for PCT/US06/17323 filed May 2, 2006, mail date Apr. 30, 2007.

* cited by examiner

*Primary Examiner*—Ricky Ngo
*Assistant Examiner*—Wei-Po Kao
(74) *Attorney, Agent, or Firm*—Stolowitz Ford Cowger LLP (57) ABSTRACT

One embodiment in accordance with the invention is a method that includes detecting a failure in a ring network and transmitting a multicast message across the ring network that includes information regarding the failure. Additionally, a new ring master of the ring network is designated. Furthermore, a ring port coupled to the failure is blocked.

25 Claims, 9 Drawing Sheets

METHOD, APPARATUS, AND SYSTEM FOR IMPROVING ETHERNET RING CONVERGENCE TIME

BACKGROUND

Some computer networking environments can include routers and switches that forward data and information between different computers and networks. One type of computer networking environment is an Ethernet ring topology where communication switches are arranged in a ring configuration. It is understood that a full ring Ethernet topology has a spatial property where there are two paths for any two switches to communicate. However, to prevent a packet from infinitely looping in the ring, one of the ports in any one switch in the ring is kept logically disabled or blocked for data traffic since there is no concept of source or destination stripping in an Ethernet ring. Additionally, each Ethernet switch in the ring performs MAC (Media Access Control) address learning, which acts as a topology discovery function. The learned MAC addresses are not only that of the switches in the ring, but can also include the devices that can be connected behind the ring switches. This means potentially the ring switches may learn thousands of MAC addresses.

It is understood that a failure can occur within the Ethernet ring topology. For example, a link between two ring switches can fail or a switch of the ring can malfunction or fail. If such a ring failure occurs, it is typically desirable to restore data connectivity as quickly as possible between any two devices in the ring through an alternate path. This restoration of data connectivity can be referred to as convergence of the ring. Typically, the amount of time to convergence in the ring is dependent on the time taken by each of the following four stages.

Specifically, the first stage involves the detection of a link status change due to link/switch failure or link/switch coming back up in the ring. The second stage usually involves communicating the link change to all the ring members. The third stage commonly involves recomputing the Spanning Tree Protocol (STP) state along with reprogramming all STP states for all the VLANs (virtual local area networks) that may be connected to the ring trunk ports. Note that this step involves computing the STP state of the ring ports for each of the VLANs. As such, the amount of time consumed in order to perform this step is proportional to the number of VLANs supported on the ring ports and also involves updating the hardware for each of the VLANs.

The fourth stage commonly involves purging the learned MAC addresses so that connectivity is maintained since a topology change has occurred. This ensures that the traffic is not forwarded in the wrong path and there is no "black-holing" of traffic. The amount of time consumed in this stage is proportional to the number of MAC addresses learned. Note that this stage can be especially time consuming, as there are typically a large number of learned MAC addresses on the ring ports that are usually trunk ports.

The invention may address one or more of the above issues.

DETAILED DESCRIPTION

Reference will now be made in detail to embodiments in accordance with the invention, examples of which are illustrated in the accompanying drawings. While the invention will be described in conjunction with embodiments, it will be understood that these embodiments are not intended to limit the invention. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, logic blocks, processing, and other symbolic representations of operations on data bits within a computing system or digital system memory. These descriptions and representations are the means used by those skilled in the art to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device.

Unless specifically stated otherwise as apparent from the following discussions, it is understood that throughout discussions of the present invention, discussions utilizing terms such as "detecting", "storing", "determining", "transmitting", "outputting", "receiving", "generating", "designating", "utilizing", "enabling", "blocking", "identifying", "multicasting", "changing", "marking", "disabling", "initiating", "forwarding", "sending" or the like, can refer to the action and processes of a computing system, or electronic device, that manipulates and transforms data. The data can be represented as physical (electronic) quantities within the computing system's registers and memories and can be transformed into other data similarly represented as physical quantities within the computing system's memories or registers or other such information storage, transmission, or display devices.

Figure 1:
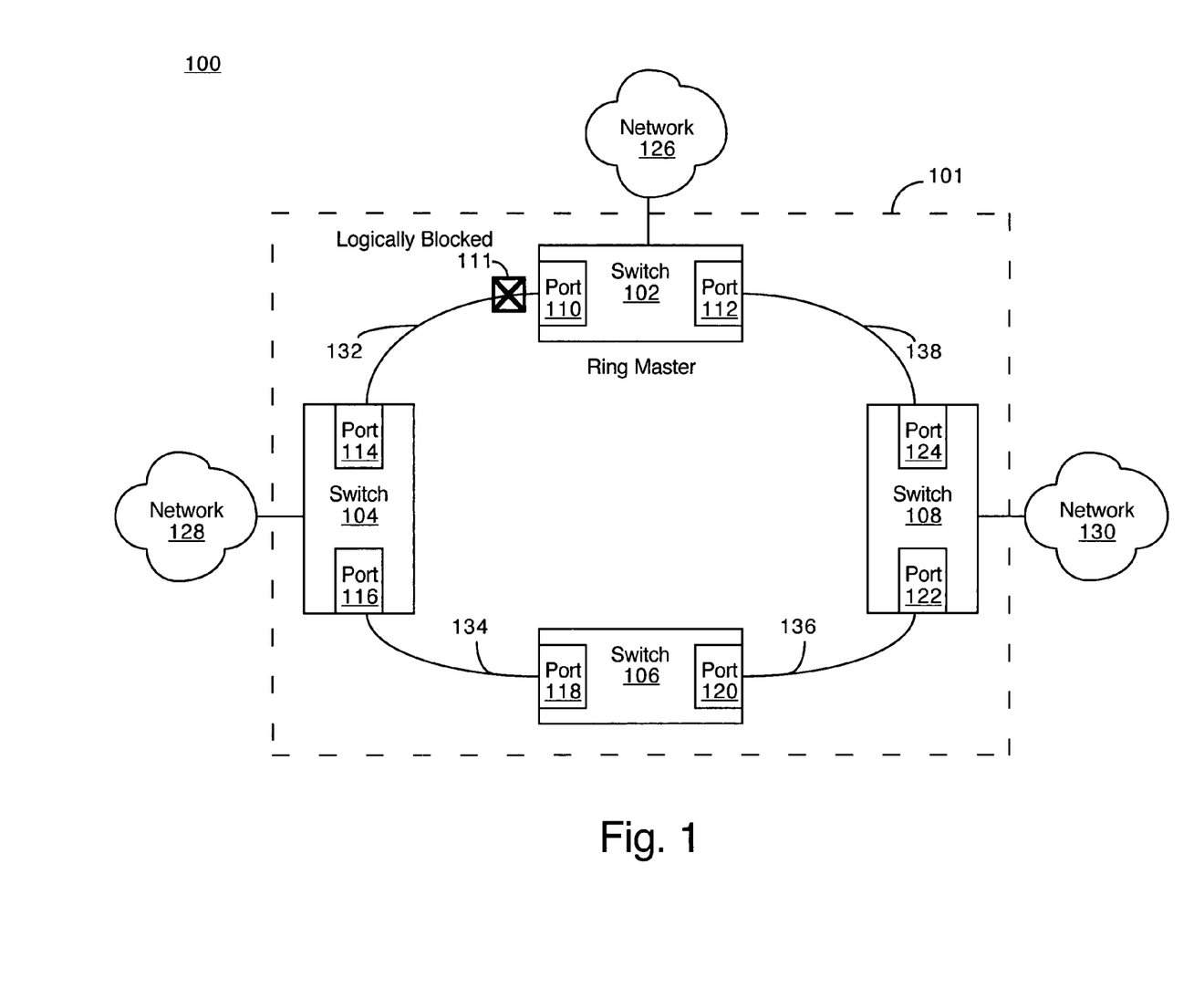
FIG. 1 is a block diagram of an exemplary network in accordance with embodiments of the invention.

FIG. 1 is a block diagram of an exemplary network 100 in accordance with embodiments of the invention. It is appreciated that the network 100 can be utilized in combination with one or more methods in accordance with embodiments of the invention, described herein, thereby enabling a quicker Layer 2 Ethernet convergence after a topology change within ring network 101. It is appreciated that network 100 includes an exemplary Ethernet ring topology or network 101.

The ring topology 101 includes communication ring switches 102, 104, 106, and 108 that are coupled in a ring configuration. Specifically, communication port 112 of switch 102 is coupled to communication port 124 of switch 108 via link 138. The communication port 122 of switch 108 is coupled to communication port 120 of switch 106 via link 136. Additionally, the communication port 118 of switch 106 is coupled to communication port 116 of switch 104 via link 134. The communication port 114 of switch 104 is coupled to communication port 110 of switch 102 via link 132.

Within FIG. 1, each of communication networks 126, 128, and 130 is coupled to the Ethernet ring topology 101. Specifically, network 126 can be coupled to communication switch 102, network 128 can be coupled to communication switch 104, and network 130 can be coupled to communication switch 108. In this configuration, electronic devices or components of communication networks 126-130 can each intercommunicate via the Ethernet ring network 101.

Within Ethernet ring topology 101, one switch (e.g., 102) can be elected or configured to be the ring master at the ring initialization. This ring master election or configuration can be implemented in diverse ways. For example, the election window can be a configurable value, for example 10 seconds, but is not limited to such. As part of the election process, an election message can be sent across ring 101 in which each of switches 102, 104, 106, and 108 records its MAC ID (Media Access Control identification). It is noted that this election process can be part of the ring topology discovery mechanism. Once the ring master (e.g., 102) has been elected or configured, the ring master 102 marks one of its ring ports (e.g., 110) in ring 101 as logically blocked 111, as indicated within FIG. 1 by the square containing an X. Conversely, all of the other communication switches 104, 106, and 108 have both their respective ring ports in a forwarding mode or state. This configuration can ensure that there is no logical loop in ring 101 and connectivity is maintained between any two ring switches of the communication switches 102-108.

Figure 4A:
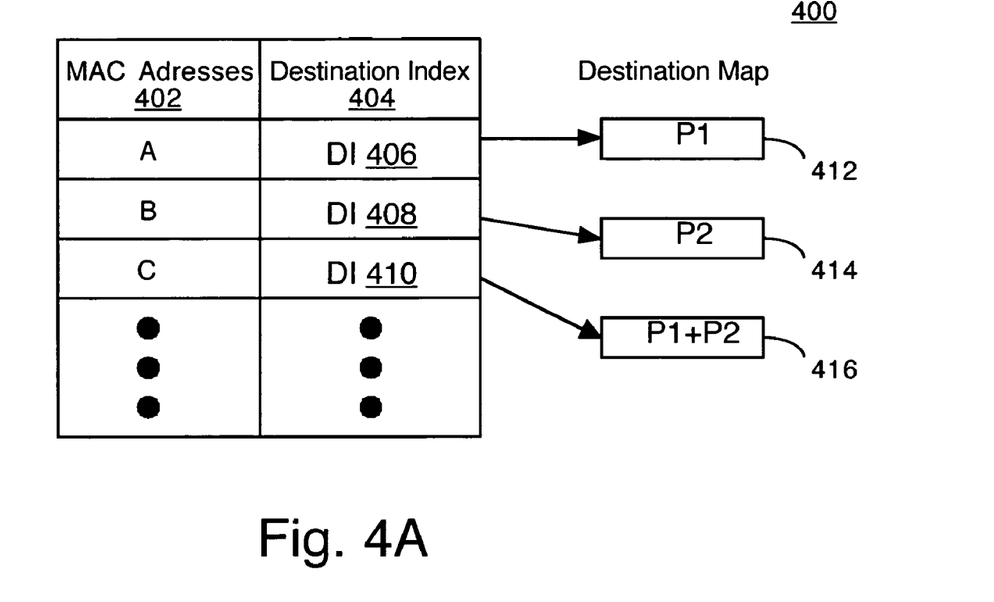
FIG. 4A illustrates an exemplary technique for handling MAC addresses in accordance with embodiments of the invention.

Note that within FIG. 1, each of the communication switches 102-108 includes two ring ports where a MAC address learning process can take place. FIG. 4A illustrates an exemplary technique 400 for handling MAC addresses for a port of a communication switch in accordance with embodiments of the invention. Specifically, each MAC address learned on a ring port as shown in MAC addresses column 402, can be programmed to point to a Destination Index (DI) 404 instead of pointing to the actual identified port. In one embodiment, two Destination Indexes (e.g., 404) can be allocated on each communication switch or node. Under typical operating conditions, each Destination Index entry (e.g., 406, 408, and 410) can point to a destination map entry (e.g., 412, 414 or 416) that identifies either or both ports of the communication switch. For example, MAC address "A" points to DI 406 which points to a destination map entry 412 that identifies a first port (P1) of the communication switch. Furthermore, MAC address "B" points to DI 408 which points to a destination map entry 414 that identifies a second port (P2) of the communication switch. Additionally, MAC address "C" points to DI 410 which points to a destination map entry 416 that identifies both the first and second ports (P1+P2) of the communication switch. In this manner, one or more ports of the communication switch (e.g., 102, 104, 106 or 108) can be correlated with each learned MAC address. Note that a greater or fewer number of destination map entries may be utilized than those shown in FIG. 4A.

Within FIG. 1, it is appreciated that Ethernet ring topology 101 can include a greater or fewer number of communication switches than the communication switches 102-108 shown. Note that ring ports 110-124 can be implemented as trunk ports and can also be Etherchannel trunks. It is understood that the networks 128-130 can each be implemented as a virtual local area network (VLAN). Network 100 can include a greater or fewer number of communication networks than the communication networks 128-130 shown. For example, communication switch 106 can be coupled to a communication network.

Figure 2:
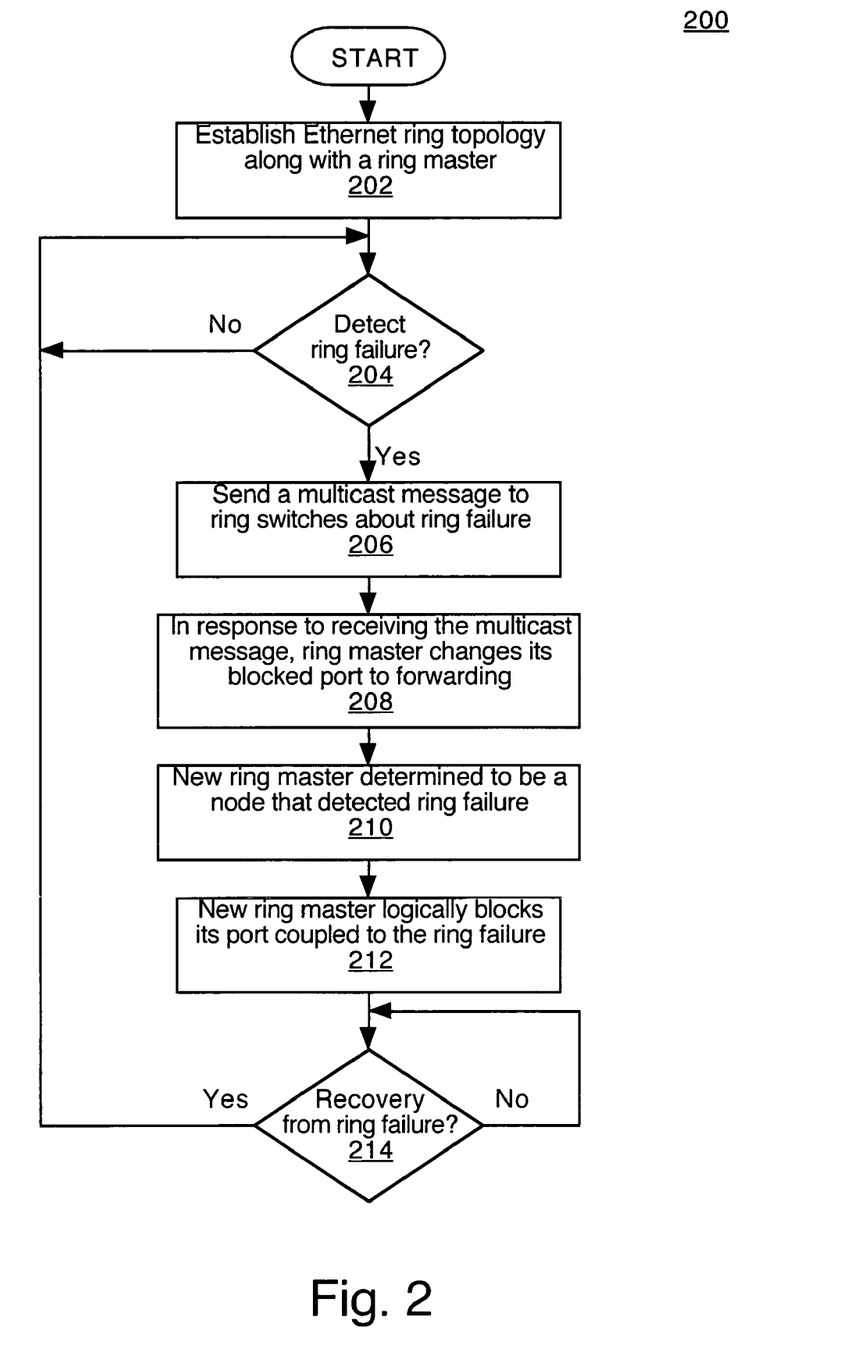
FIG. 2 is a flowchart of a method in accordance with embodiments of the invention for improving Ethernet ring topology convergence time.

FIG. 2 is a flowchart of a method 200 in accordance with embodiments of the invention for improving Layer 2 convergence time in an Ethernet ring topology. Method 200 includes exemplary processes of an embodiment of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory, and/or mass data storage that are usable by an electronic device. However, the electronic device readable and executable instructions (or code) may reside in any type of electronic device readable medium or any type of computing device readable medium. Although specific operations are disclosed in method 200, such operations are exemplary. That is, method 200 may not include all of the operations illustrated by FIG. 2. Additionally, method 200 may include various other operations and/or variations of the operations shown by FIG. 2. Likewise, the sequence of the operations of method 200 can be modified. It is noted that the operations of method 200 can each be performed by software, by firmware, by electronic hardware, or by any combination thereof.

Specifically, an Ethernet ring topology or network can be established that includes multiple communication switches along with one of those switches being configured and/or elected to be the ring master. Next a determination can be made as to whether a link or device failure is detected within the Ethernet ring topology. If not, the detection determination can be repeated. However, if a link or device failure is detected, a multicast message about the failure can be sent to the other ring switches. In response to receiving the multicast message, a ring master of the Ethernet ring topology can change its logically blocked ring port to a forwarding state. The new ring master of the Ethernet ring topology can then be determined to be a node that detected the failure. The new ring master can then logically block its ring port that is coupled to the failed component of the ring. In this manner, the amount of time for the Ethernet ring topology to reach convergence can be reduced after a change in its topology.

At operation 202 of FIG. 2, an Ethernet ring topology or network (e.g., 101) can be established that includes multiple communication switches along with one of those switches being configured and/or elected to be the ring master. It is understood that operation 202 can be implemented in a wide variety of ways. In one embodiment for example, the Ethernet ring topology of operation 202 can be established in any manner similar to that described herein with reference to Ethernet ring topology 101 of FIG. 1. Furthermore, the ring master of the established Ethernet ring topology can be configured and/or elected at operation 202 in any manner similar to that described herein, but is not limited to such. Additionally, once the ring master is configured and/or elected, one of its ring ports can be logically blocked at operation 202. For example, the logically blocking can be accomplished by installing on the hardware of the desired ring port the following three TCAM (Tenary Context Addressable Memory) entries: a learning entry to drop all incoming packets; an output IP (Internet Protocol) ACL (Access Control List) entry to drop all outgoing IP packets; and an output MAC ACL entry to drop all outgoing non-IP packets. As part of establishing the Ethernet ring topology at operation 202 in accordance with an embodiment, the hardware of both ring ports of each of communication switch of the Ethernet ring topology can be programmed to forward data traffic for each of the VLANs that may be coupled to the Ethernet ring topology.

Figure 3:
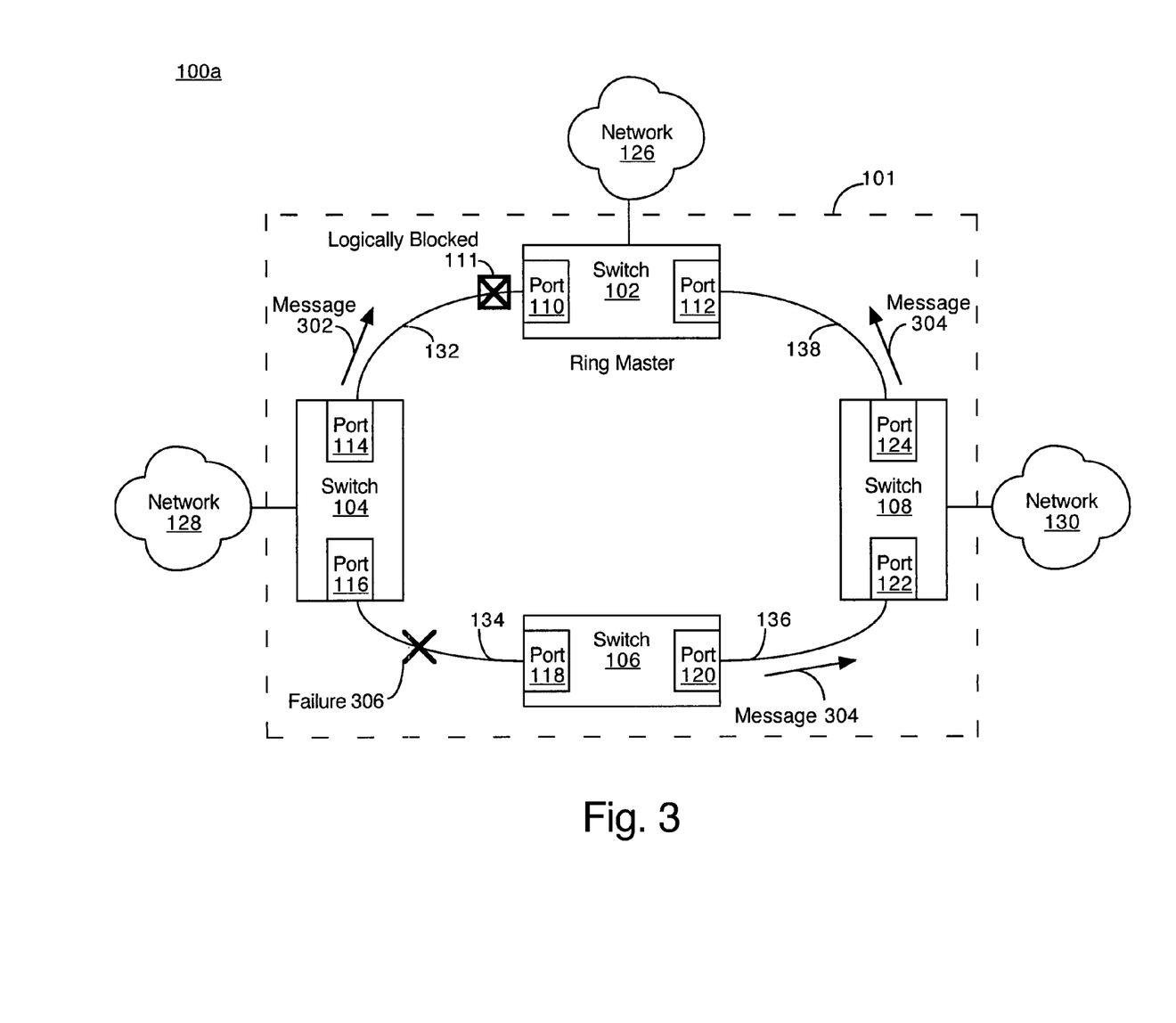
FIG. 3 is a block diagram of an exemplary network where a ring failure occurs in accordance with embodiments of the invention.

At operation 204, a determination can be made as to whether a link and/or device failure is detected within the established Ethernet ring topology (e.g., 101). If a failure is not detected at operation 204, process 200 proceeds to the beginning of operation 204. However, if it is determined at operation 204 that a link and/or device failure is detected within the Ethernet ring topology, process 200 proceeds to operation 206. Note that operation 204 can be implemented in a wide variety of ways. For example in one embodiment, two adjacent communication switches within the Ethernet ring topology can each detect at operation 204 when a link and/or device fails between them. For instance, FIG. 3 is a block diagram of an exemplary network 100a wherein a failure 306 occurs to link 134 in accordance with embodiments of the invention. As such, communication switches 104 and/or 106 can detect when that failure 306 of link 134 occurs. It is appreciated that the detection of a link and/or device failure at operation 204 by a communication switch can be implemented using a fast link detection scheme, which is handled at a hardware interrupt level. Furthermore, when the hardware of a communication switch detects the link failure at operation 204, it can notify software operating on the switch rather than the software polling the hardware. In this manner, the detection of the ring failure at operation 204 can occur in a quick manner.

At operation 206 of FIG. 2, the one or more communication switches that detected the ring failure can transmit across the Ethernet ring topology a multicast notification message regarding the occurrence of the ring failure. Understand that operation 206 can be implemented in a wide variety of ways. For example, FIG. 3 shows port 114 of switch 104 transmitting a multicast notification message 302 via link 132 while port 120 of switch 106 transmits a multicast notification message 304 via link 136. In one embodiment of operation 206, the multicast notification message can be transmitted at operation 206 by the detecting switches in the same interrupt context that the ring failure was detected and a retry timer can be started. Additionally, the notification message can be a multicast at operation 206 to a special MAC address. Moreover, the multicast packet can be forwarded at operation 206 in hardware by each intermediate switch of the Ethernet ring network while each intermediate switch sends a copy to its processor or CPU (Central Processor Unit). In this fashion, all of the nodes in the ring can be notified of the ring failure (e.g., 306) in a substantially instantaneous manner. Also, the information seen by any node in the ring can be the same as transmitted at operation 206 by each node detecting the link failure.

Figure 4B:
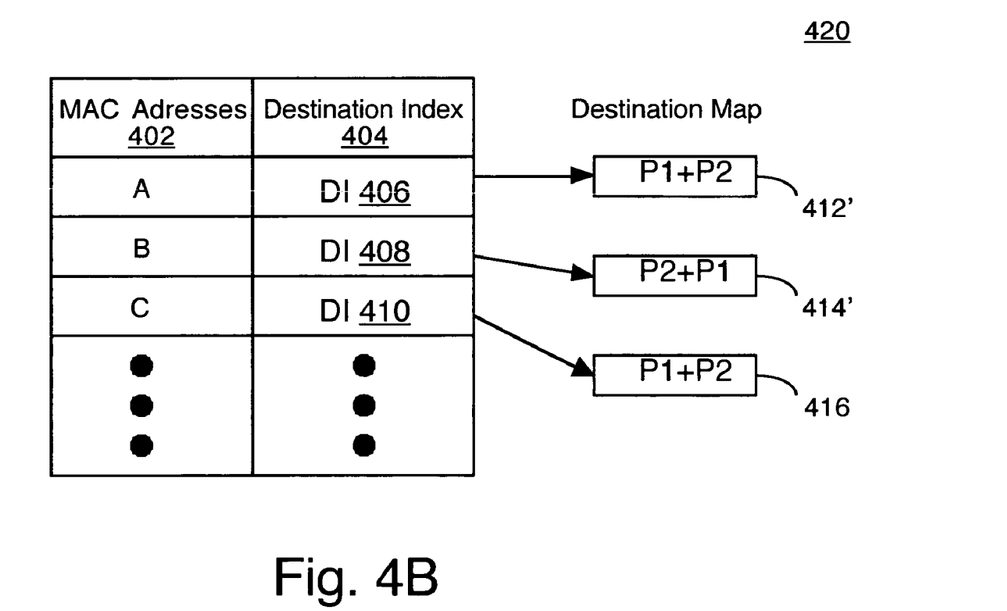
FIG. 4B illustrates an exemplary technique for setting each destination map entry in accordance with embodiments of the invention.

Note that when each communication switch of the ring topology receives the multicast notification message at operation 206, the switch can disable its MAC address learning process on both its ring ports. Additionally, each communication switch can set each of its destination map entries to point to both of its ring ports. For example, FIG. 4B illustrates an exemplary technique 420 for setting each destination map entry to point to both of its ring ports in accordance with embodiments of the invention. Specifically, the destination map entry 412 of FIG. 4A has been changed from "P1" to "P1+P2" as shown in destination map entry 412' of FIG. 4B. Furthermore, the destination map entry 414 of FIG. 4A has been changed from "P2" to "P2+P1" as shown in destination map entry 414' of FIG. 4B. It is appreciated that destination map entry 416 remains unchanged from FIG. 4A to FIG. 4B since it is already pointing at both ring ports. As such, causing each destination map entry (e.g., 412, 414, and 416) to point to both ring ports causes the communication packets to be flooded in the ring ports of the switches, so the connectivity within the ring topology is maintained. Furthermore, so not to adversely affect the convergence time of the ring topology, a background process can be initiated by each intermediate switch at operation 206 wherein the MAC addresses learned previously to the ring failure are purged. Additionally, once each intermediate switch completes its MAC address purging process at operation 206, a MAC address learning process can be re-enabled. It is understood that if each MAC address (e.g., "A") of column 402 of FIG. 4B is relearned again along with its corresponding port, the corresponding destination map entry (e.g., 412') can be changed from "P1+P2" back to the corresponding port (e.g., "P1" as shown within destination map entry 412 of FIG. 4A).

Figure 5:
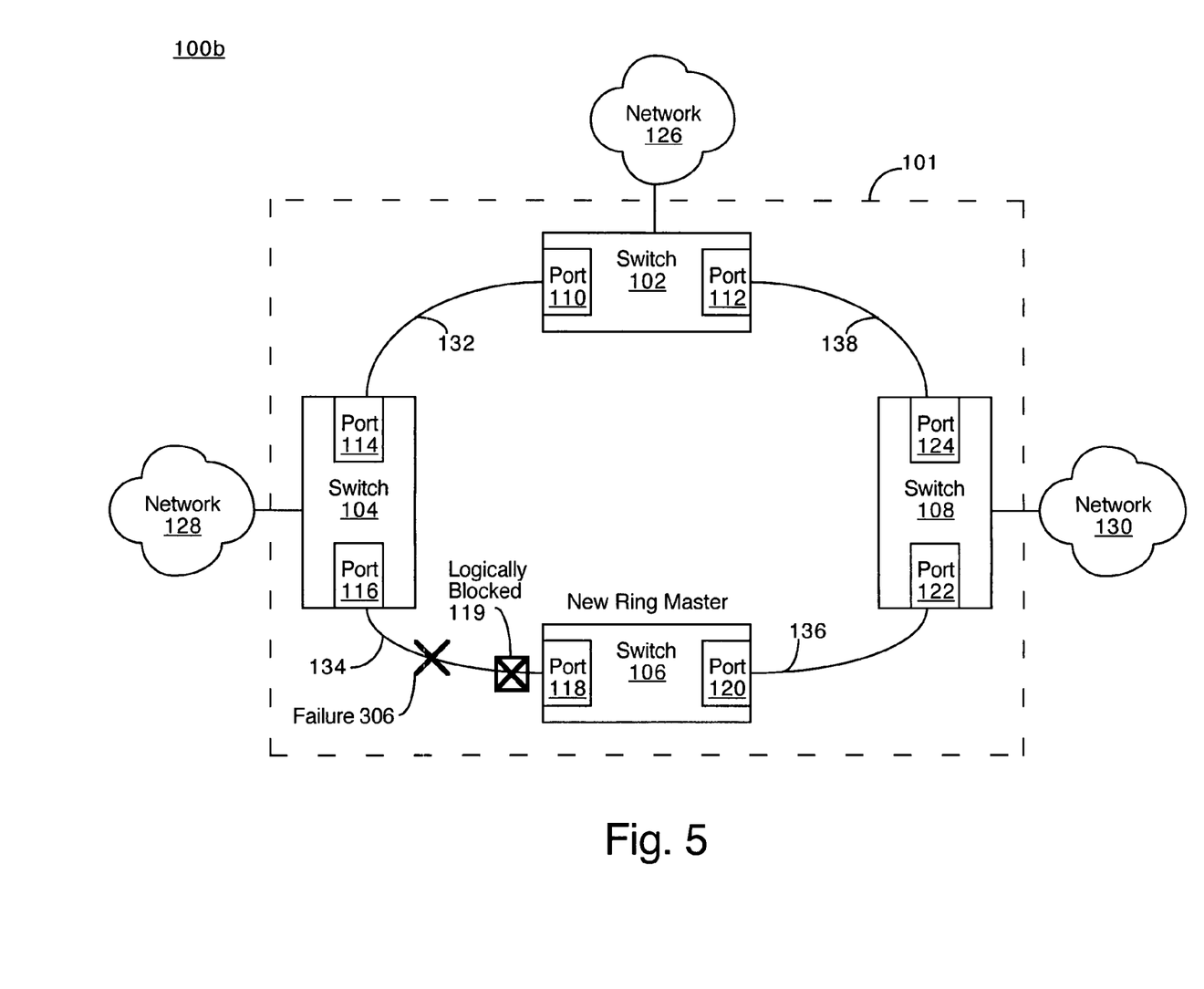
FIG. 5 is a block diagram of an exemplary network wherein a switch has received a multicast notification message in accordance with embodiments of the invention.

At operation 208 of FIG. 2, in response to receiving one or more multicast notification messages, the ring master can change its logically blocked communication port to a forwarding state. It is appreciated that operation 208 can be implemented in a wide variety of ways. For example, FIG. 5 is a block diagram of an exemplary network 100b wherein switch 102 has received one or more multicast notification messages 302 and/or 304 in accordance with embodiments of the invention. As such, switch 102 has changed ring port 110 to a forwarding state by removed the logically blocking 111 from ring port 110. In one embodiment of operation 208, the ring master can change its logically blocked communication port at operation 208 to a forwarding state in a single hardware update operation, which can be handled at the interrupt level. In this manner, connectivity can be maintained within the Ethernet ring topology and since the hardware update at operation 208 can be an atomic (or extremely minute) operation, the amount of time involved is drastically reduced as compared to conventional techniques. In an embodiment, the ring master can change the blocked ring port to a forwarding state at operation 208 by invalidating the learning entry to drop all incoming packets of that ring port; by invalidating the output IP ACL entry to drop all outgoing IP packets of that ring port; and by invalidating the output MAC ACL entry to drop all outgoing non-IP packets of that ring port. It is noted that in addition to the ring master changing its logically blocked communication port to a forwarding state at operation 208, the ring master can also perform the operations that each intermediate switch can perform as described above with reference to operation 206.

At operation 210, a new ring master can be determined to be one of the communication switches of the Ethernet ring topology that detected the link failure. It is noted that operation 210 can be implemented in a wide variety of ways. In one embodiment for example, since the old ring master can receive the multicast notification message from each of the switches (or nodes) that detected the link failure, the old ring master can determine at operation 210 which switch will become the new ring master. Furthermore, once it is determined at operation 210 which switch is the new ring master, the old ring master can transmit a message informing both switches which one will be the new ring master.

Alternatively, since there can be at least two switches (or nodes) of the ring topology that detected the ring failure, the new master can be determined at operation 210 utilizing one or more parameters or rules (e.g., the switch with the lowest or highest MAC address) associated with those switches. In one embodiment, operation 210 can be implemented between the switches (or nodes) that detected the ring failure. For example, the switches that detected the ring failure can communicate to determine at operation 210 which switch should be the new ring master. In another embodiment, operation 210 can be implemented independently by each of the switches (or nodes) that detected the ring failure. For example, each of the switches that detected the ring failure can independently determine at operation 210 if it should be the new ring master without communicating with the other switch. This can be done if each of the switches that detected the ring failure knows one or more parameters (e.g., MAC address) associated with the other switch. In this manner, each switch can determine at operation 210 if it should be the new master of the Ethernet ring network or topology. Note that FIG. 5 shows switch 106 as the new ring master of Ethernet ring topology 101 with switch 102 no longer having any ring master functionality.

At operation 212 of FIG. 2, the new ring master of the Ethernet ring topology can logically block its ring port coupled to the failure associated with the ring. It is understood that operation 212 can be implemented in a wide variety of ways. In one embodiment for example, the new ring master at operation 212 can logically change its ring port coupled to the ring failure from a forwarding state (or mode) to a logical blocking state (or mode) in a single hardware update operation. It is understood that operation 212 can be implemented in any manner similar to that described herein, but is not limited to such. Note that it can be advantageous to have the new ring master perform operation 212. For example, if at some point in time the failure of the ring recovers and begins operating, the logically blocked ring port of the new ring master avoids any transient loops from occurring within the Ethernet ring topology. Additionally, if the failure of the ring network recovers, there will not be any change in the topology of the Ethernet ring network and therefore there will not be any need for any state changes (e.g., forwarding/blocking) on any of the ring ports for any of the switches in the ring. Note that FIG. 5 shows the new ring master 106 has marked its ring port 118 as logically blocked 119, as indicated by the square containing an X.

Figure 6:
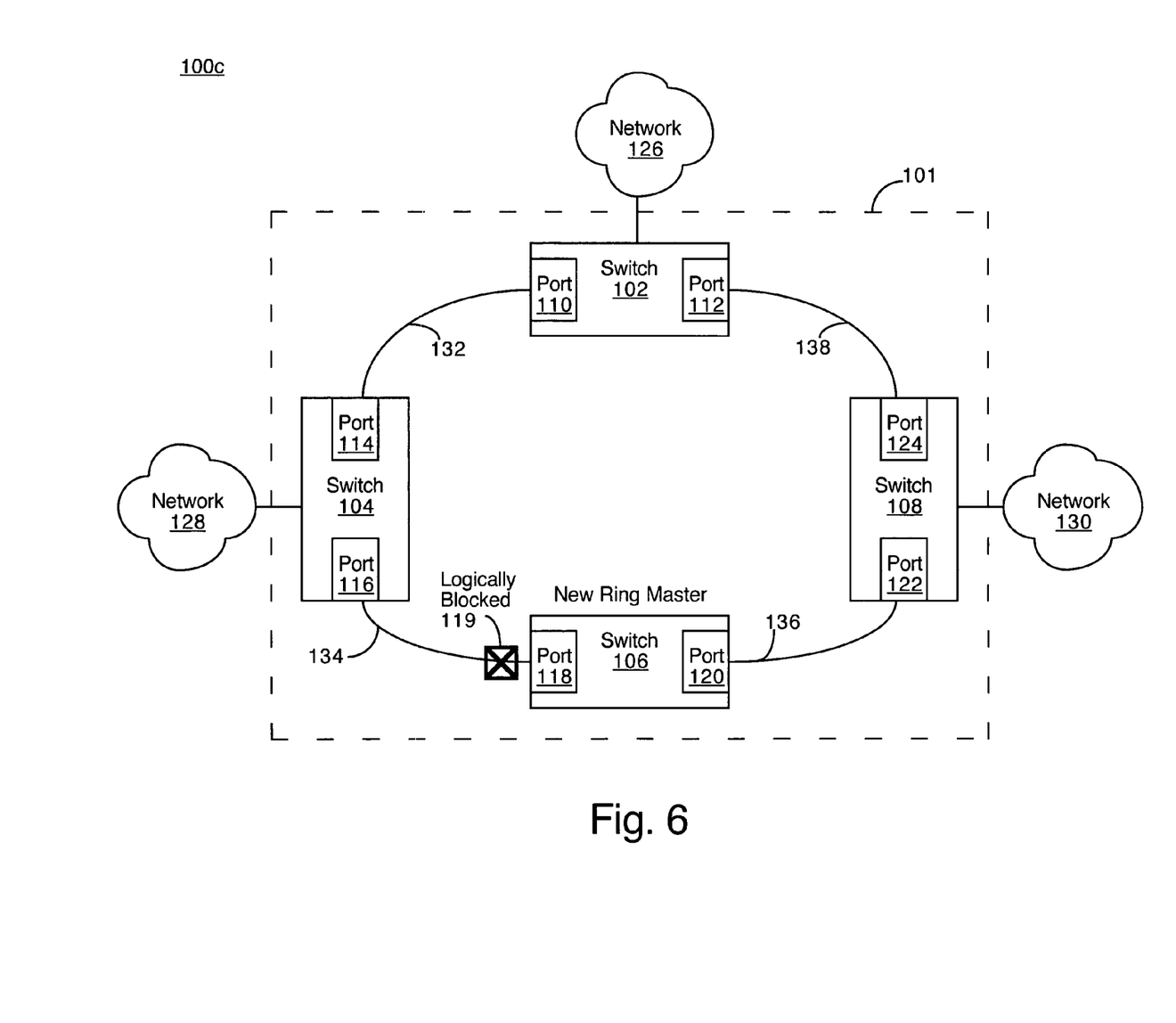
FIG. 6 is a block diagram of an exemplary network wherein a link failure has recovered in accordance with embodiments of the invention.

At operation 214, a determination can be made as to whether the failure of the Ethernet ring topology has recovered or began operating as before the failure. If it is determined at operation 214 that the failure has not recovered, method 200 proceeds to the beginning of operation 214. Conversely, if it is determined that the link failure has recovered at operation 214, method 200 proceeds to operation 202. It is appreciated that operation 214 can be implemented in a wide variety of ways. For example in one embodiment, the new ring master at operation 214 can periodically send ring health check or discovery messages from its forwarding ring port. Additionally, upon receipt of a ring health check or discovery message at one of its ring ports, each of the other switches of the Ethernet ring topology can then forward the ring health check or discovery message in hardware to its other ring port. Note that if the ring master at operation 214 receives the ring health check or discovery message at its blocked ring port, then the ring master knows that the ring failure has recovered. Note that FIG. 6 is a block diagram of an exemplary network 100c wherein a link failure (e.g., 306) has recovered in accordance with embodiments of the invention. As such, link 134 has recovered since the failure 306 (of FIG. 5) is no longer present on link 134.

Within FIG. 2, method 200 includes embodiments of the invention for improving Layer 2 convergence time in an Ethernet ring topology. Note that method 200 reduces the convergence time of an Ethernet ring topology drastically and can be a constant time. Furthermore, the convergence time of the Ethernet ring topology does not vary with the number of MAC addresses learned by the ring switches or the number of VLANs coupled to the ring topology. Additionally, the link status change information can be almost instantaneously multicast to all the nodes in the ring rather than the hop-by-hop mechanism used in the conventional STP. Moreover, since the ring master is dynamically moved in method 200 to a switch detecting the link failure, the link healing process can be greatly optimized. The new ring master can perform ring health checks without using up any VLAN so that they can be used as data VLANs. Note that method 200 can also be utilized with a Metro Ethernet Ring topology, but is not limited to such.

Figure 7:
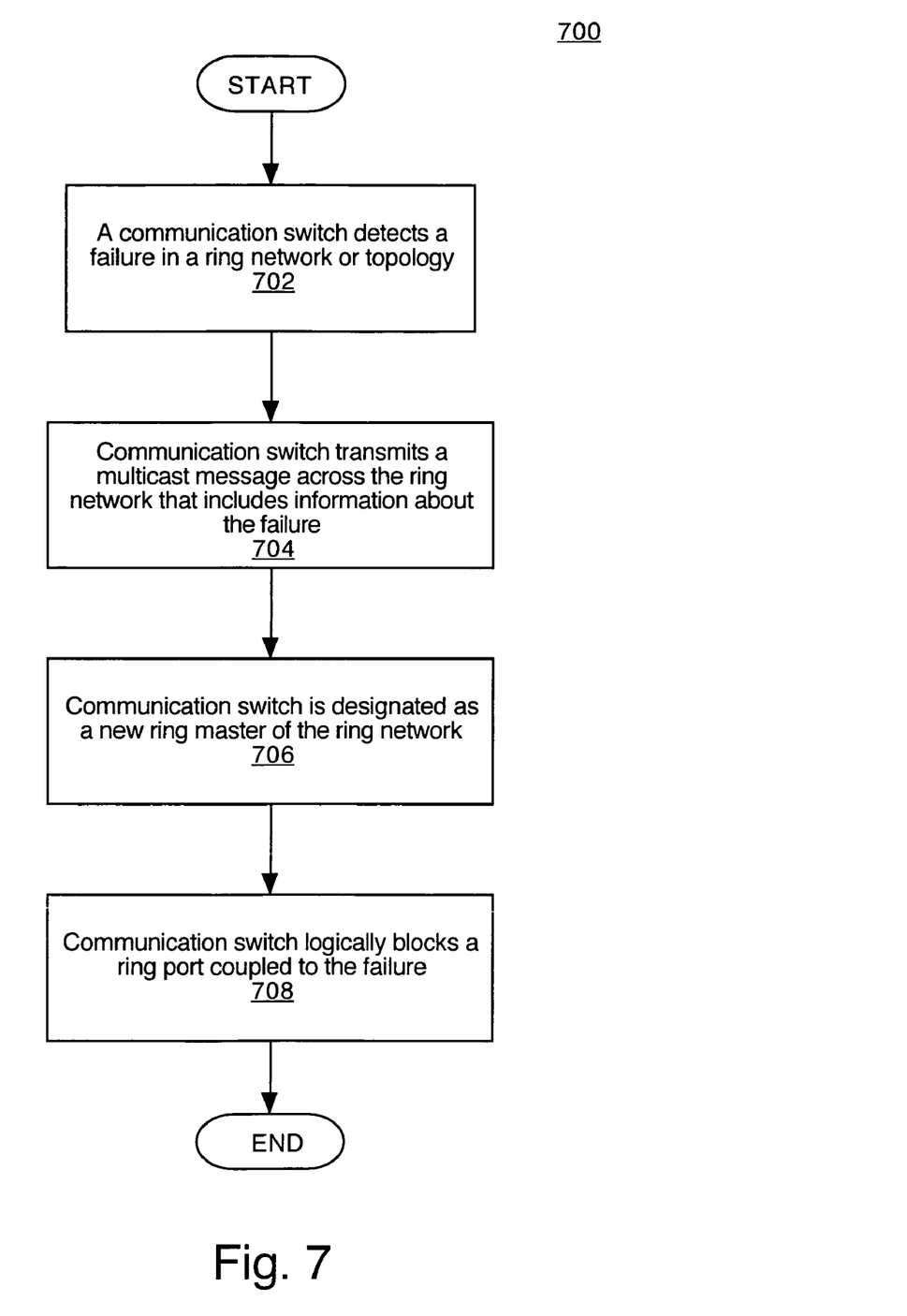
FIG. 7 is a flowchart of a method in accordance with embodiments of the invention for improving convergence time in a ring topology.

FIG. 7 is a flowchart of a method 700 in accordance with embodiments of the invention for improving convergence time in a ring topology. Method 700 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory, and/or mass data storage that are usable by an electronic device. However, the electronic device readable and executable instructions (or code) may reside in any type of electronic device readable medium or any type of computing device readable medium. Although specific operations are disclosed in method 700, such operations are exemplary. That is, method 700 may not include all of the operations illustrated by FIG. 7. Additionally, method 700 may include various other operations and/or variations of the operations shown by FIG. 7. Likewise, the sequence of the operations of method 700 can be modified. It is noted that the operations of method 700 can each be performed by software, by firmware, by electronic hardware, or by any combination thereof.

Specifically, a communication switch can detect a failure in a ring network. Note that the communication switch is part of the ring network. The communication switch can transmit a multicast message across the ring network that includes information about the failure. The communication switch can be designated as a new ring master of the ring network. The communication switch can logically block a ring port coupled to the failure in the ring network.

At operation 702 of FIG. 7, a communication switch can detect a failure in a ring network or topology. Note that operation 702 can be implemented in a wide variety of ways. For example, the communication switch can detect at operation 702 a failure in the ring network in any manner similar to that described herein, but is not limited to such. Understand that the communication switch and the ring network of operation 702 can each be implemented in any manner similar to that described herein, but is not limited to such.

At operation 704, the communication switch can transmit a multicast message across the ring network that includes information about the failure. It is understood that operation 704 can be implemented in a wide variety of ways. For example, the transmission at operation 704 of a multicast message by the communication switch across the ring network that includes information about the failure can be implemented in any manner similar to that described herein, but is not limited to such.

At operation 706 of FIG. 7, the communication switch can be designated as a new ring master of the ring network. It is appreciated that operation 706 can be implemented in a wide variety of ways. For example, the communication switch at operation 706 can be designated (or determined to be) a new ring master of the ring network in any manner similar to that described herein, but is not limited to such.

At operation 708, the communication switch can logically block a ring port coupled to the failure in the ring network. It is noted that operation 708 can be implemented in a wide variety of ways. For example, the communication switch at operation 708 can logically block a ring port coupled to the failure in any manner similar to that described herein, but is not limited to such. Upon completion of operation 708, process 700 can be ended.

Figure 8:
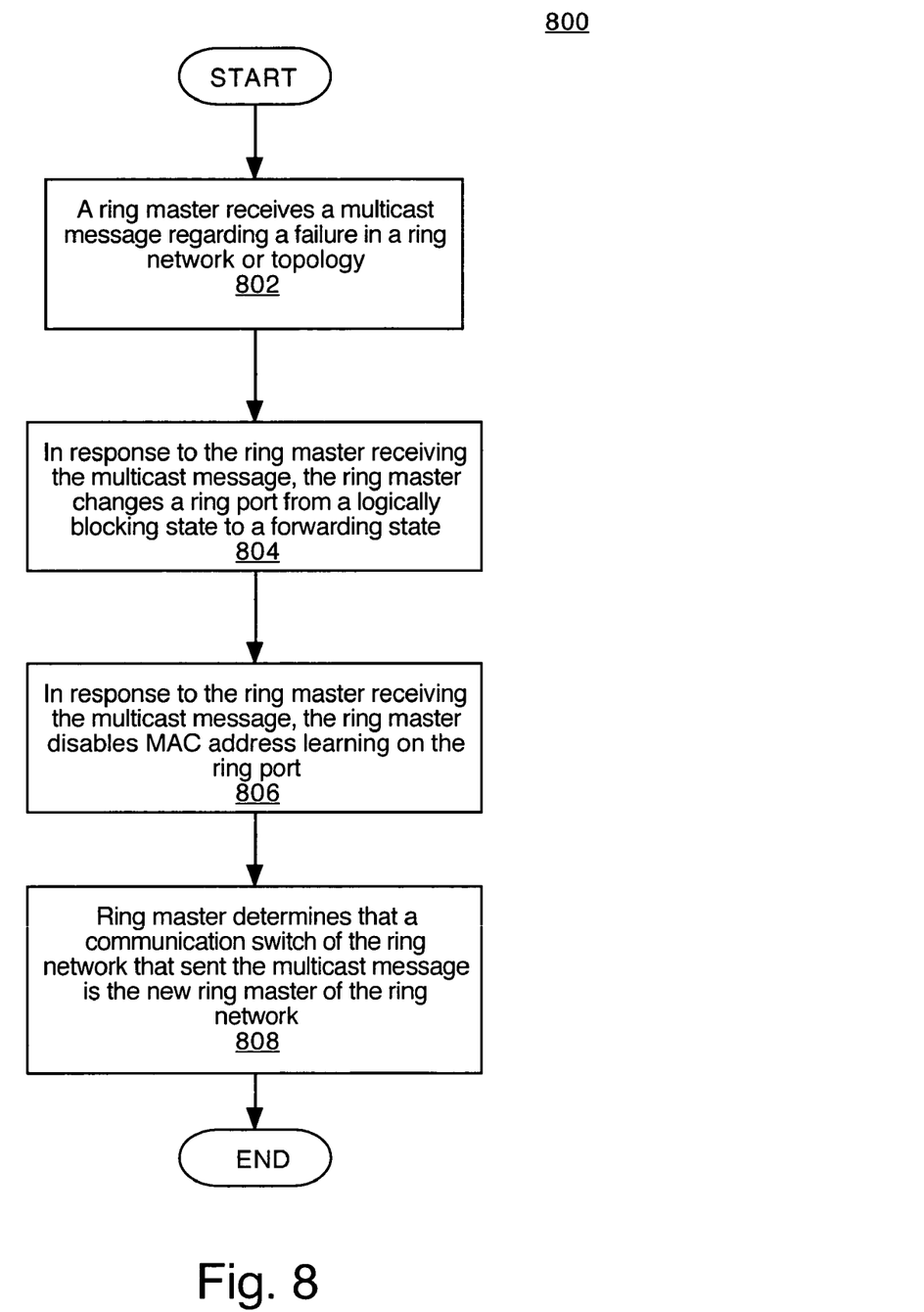
FIG. 8 is a flowchart of another method in accordance with embodiments of the invention for improving convergence time in a ring topology.

FIG. 8 is a flowchart of a method 800 in accordance with embodiments of the invention for improving convergence time in a ring topology. Method 800 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory, and/or mass data storage that are usable by an electronic device. However, the electronic device readable and executable instructions (or code) may reside in any type of electronic device readable medium or any type of computing device readable medium. Although specific operations are disclosed in method 800, such operations are exemplary. That is, method 800 may not include all of the operations illustrated by FIG. 8. Additionally, method 800 may include various other operations and/or variations of the operations shown by FIG. 8. Likewise, the sequence of the operations of method 800 can be modified. It is noted that the operations of method 800 can each be performed by software, by firmware, by electronic hardware, or by any combination thereof.

Specifically, a ring master can receive a multicast message regarding a failure in a ring network. The ring master is a communication switch that is part of the ring network. In response to the ring master receiving the multicast message, the ring master can change a ring port from a logically blocking state to a forwarding state. Also in response to the ring master receiving the multicast message, the ring master can disable MAC address learning on the ring port. The ring master can also determine that a communication switch of the ring network that sent the multicast message is the new ring master of the ring network.

At operation 802 of FIG. 8, a ring master can receive a multicast message regarding a failure in a ring network or topology. The ring master is a communication switch that is part of the ring network. It is noted that operation 802 can be implemented in a wide variety of ways. For example, the ring master at operation 802 can receive the multicast message about the failure in the ring network in any manner similar to that described herein, but is not limited to such.

At operation 804, in response to the ring master receiving the multicast message, the ring master can change a ring port from a logically blocking state to a forwarding state. Understand that operation 804 can be implemented in a wide variety of ways. For example, the ring master at operation 804 can change a ring port from a logically blocking state to a forwarding state in any manner similar to that described herein, but is not limited to such.

At operation 806 of FIG. 8, in response to the ring master receiving the multicast message, the ring master can disable MAC address learning on the ring port. It is appreciated that operation 806 can be implemented in a wide variety of ways. For example, the ring master at operation 806 can disable MAC address learning on one or more ring ports in any manner similar to that described herein, but is not limited to such.

At operation 808, the ring master can determine that a communication switch of the ring network that sent the multicast message is the new ring master of the ring network. Note that operation 808 can be implemented in a wide variety of ways. For example, the ring master can determine at operation 808 that a communication switch of the ring network that sent the multicast message is the new ring master of the ring network in any manner similar to that described herein, but is not limited to such. Upon completion of operation 808, process 800 can be ended.

Figure 9:
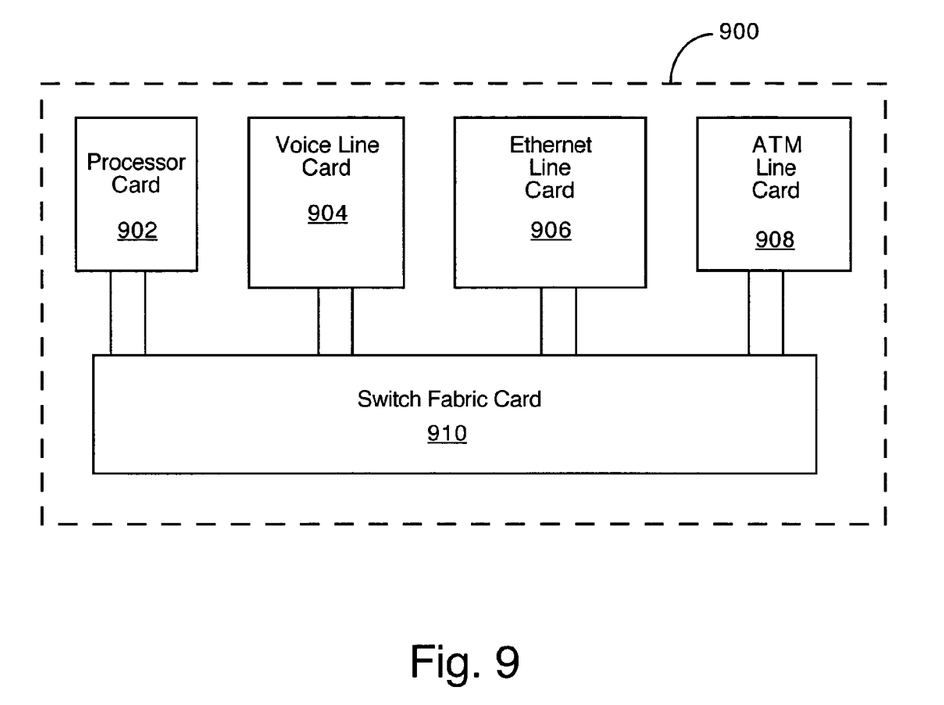
FIG. 9 is a block diagram of an exemplary network communication switch (or router) in accordance with embodiments of the invention.

FIG. 9 is a block diagram of an exemplary network communication switch (or router) 900 in accordance with embodiments of the invention. Within the discussions of embodiments in accordance with the invention herein, certain processes and operations were discussed that may be realized, in some embodiments, as a series of instructions or code (e.g., software program) that may reside within readable memory of switch 900 and executed by a processor(s) of switch 900. When executed, the instructions (or code) may cause one or more components of switch 900 to perform specific operations and exhibit specific behavior which are described herein. Note that any network switch or router (e.g., 102, 104, 106, or 108) mentioned herein with reference to FIGS. 1-8 can be implemented in a manner similar to switch (or router) 900, but is not limited to such. It is appreciated that network switch 900 may not include each element shown by FIG. 9. Also, network switch 900 can include one or more elements that are not shown by FIG. 9.

Network switch (or router) 900 includes one or more switch fabric cards (and/or buses) 910 for communicating information, one or more processor cards 902 coupled with switch fabric card(s) 910 for, but not limited to, making centralized decisions related to line cards 904, 906, and 908, along with what to enable, how signals should be driven, and the like. Processor card(s) 902 may include one or more microprocessors or any other type of processor. The switch 900 may also include, but is not limited to, one or more voice line cards 904, one or more Ethernet line cards 904, and one or more Asynchronous Transfer Mode (ATM) line cards 908 coupled with switch fabric card(s) 910 for forwarding data and information between different computers and/or networks. Each voice line card 904 can be implemented in a wide variety of ways. For example, a voice line card 904 can be implemented as, but is not limited to, a time-division multiplexing (TDM) card that can include one or more digital signal processors (DSPs), any type of voice circuit card, and the like. Note that network switch (or router) 900 can be implemented with redundant processor cards (e.g., 902) and line cards for those cards (e.g., 904, 906, and 908) shown. Furthermore, network switch 900 can include any type and any number of cards, line cards, and/or processor cards. Note that network switch 900 can include data storage features such as, but not limited to, volatile memory, non-volatile memory, and/or mass data storage.

The foregoing descriptions of specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method comprising:
    detecting a failure of data communicability in a ring network;
    transmitting a multicast message across said ring network to an existing ring master, said multicast message comprising information about said failure;
    temporarily disabling MAC (Media Access Control) address learning in said ring network independent of MAC address flushing, in response to receiving said multicast message;
    designating a new ring master of said ring network preemptively before recovery from said failure of data communicability including electing one of a pair of ring devices of said ring network as said new ring master, said pair of ring devices proximate said failure; and
    blocking a ring port of said new ring master coupled to said failure, wherein said blocking comprises: dropping all incoming data traffic, dropping all outgoing IP (Internet Protocol) data traffic responsive to an output IP ACL (Access Control List) and dropping all outgoing non-IP data traffic responsive to an output MAC ACL.

2. The method as described in claim 1, further comprising switching said blocking said ring port of said new ring master to forwarding by invalidating procedures for:
    dropping all incoming data traffic;
    dropping all outgoing IP data traffic responsive to an output IP ACL; and
    dropping all outgoing non-IP data traffic responsive to an output MAC ACL.

3. The method as described in claim 1, wherein said transmitting said multicast message and said blocking is performed at a hardware level.

4. A communication switch comprising:
    a processor;
    a bus coupled to said processor; and
    a memory device coupled to said bus to communicate with said processor for performing a method comprising:
        detecting a failure of data communicability in a ring network, wherein said communication switch is part of said ring network;
        transmitting a multicast message across said ring network to an existing ring master said multicast message comprising information about said failure;
        temporarily disabling MAC address learning in said ring network independent of MAC address flushing, in response to receiving said multicast message;
        determining if said communication switch is a ring master of said ring network preemptively before recovery of said failure of data communicability including electing said communication switch as said new ring master from a pair of ring devices of said ring network proximate said failure; and
        blocking a ring port of said communication switch coupled to said failure, wherein said blocking comprises: dropping all incoming data traffic, dropping all outgoing IP data traffic responsive to an output IP ACL and dropping all outgoing non-IP data traffic responsive to an output MAC ACL.

5. The communication switch of claim 4 wherein said processor further performs the method comprising;
    flushing MAC addresses learned prior to detecting said failure;
    re-enabling said MAC address learning after said flushing of said MAC addresses; and
    switching said blocking to forwarding by invalidating procedures for: dropping all incoming data traffic, dropping all outgoing IP data traffic responsive to an output IP ACL and dropping all outgoing non-IP data traffic responsive to an output MAC ACL.

6. The communication switch of claim 4, wherein said transmitting said multicast message is performed at a hardware interrupt level.

7. A system comprising:
    means for detecting a failure of data communicability in a ring topology;
    means for transmitting a multicast message across said ring topology to an existing ring master, said multicast message comprising information about said failure;
    means for temporarily disabling MAC address learning in said ring topology prior to initiating MAC address flushing, in response to receiving said multicast message;
    means for determining if a communication switch of said ring topology should be a new ring master of said ring topology preemptively before recovery of said failure of data communicability including means for electing said communication switch as said new ring master from only one of a pair of ring devices of said ring topology proximate said failure; and
    means for blocking a ring port of said communication switch coupled to said failure, wherein said blocking comprises: dropping all incoming data traffic, dropping all outgoing IP (Internet Protocol) data traffic responsive to an output IP ACL and dropping all outgoing non-IP data traffic responsive to an output MAC ACL.

8. The system of claim 7 further comprising:
    means for flushing MAC addresses learned prior to detecting said failure; and
    means for switching said blocking to forwarding by invalidating procedures for: dropping all incoming data traffic, dropping all outgoing IP data traffic responsive to an output IP ACL and dropping all outgoing non-IP data traffic responsive to an output MAC ACL.

9. The system of claim 8 further comprising re-enabling said MAC address learning after said flushing of MAC addresses learned prior to detecting said failure.

10. A method comprising:
    receiving at a first device of a ring network a multicast message regarding a failure in the ring network from a second device including at least one of a pair of devices proximate said failure;
    changing one of a pair of ring ports of said first device from a blocking state to a forwarding state, in response to said receiving said multicast message wherein changing said blocking state to said forwarding state comprises invalidating procedures for: dropping all incoming data traffic, dropping all outgoing IP data traffic responsive to an output IP ACL and dropping all outgoing non-IP data traffic responsive to an output MAC ACL;

electing one of said pair of proximate devices as a new ring master of said ring network, said new ring master blocking a ring port coupled to said failure; and temporarily terminating MAC address learning on said pair of ring ports of said first device prior to MAC address flushing, in response to said receiving said multicast message and also, in response, concurrently and bidirectionally flooding data transmitted by said first device onto said ring network using both of said pair of ring ports of said first device.

11. The method as described in claim 10, further comprising:

receiving at a third device of said ring network said multicast message from said second device;

relaying said multicast message to a next device from said third device; and temporarily disabling MAC address learning on a pair of ring ports of said third device, in response to receiving said multicast message and also, in response, bidirectionally flooding data transmitted by said third device onto said ring network using both of said pair of ring ports of said third device.

12. The method as described in claim 11, wherein said changing said ring port to said forwarding state is performed at a hardware interrupt level of said ring port wherein said forwarding maintains connectivity within said ring network topology independent of reprogramming an STP (Spanning Tree Protocol) state for all VLANS connected to said ring port to maintain a constant ring network convergence time.

13. A ring master communication switch comprising:
a processor;
a bus coupled to said processor; and
a memory device coupled to said bus to communicate with said processor for performing a method comprising:
receiving at said ring master communication switch a multicast message from another ring device regarding a failure in a ring topology, said ring master communication switch is part of said ring topology;
changing one of a pair of ring ports of said ring master communication switch from a blocking state to a forwarding state, in response to said receiving said multicast message, wherein changing said blocking state to said forwarding state comprises invalidating procedures for: dropping all incoming data traffic, dropping all outgoing IP data traffic responsive to an output IP ACL and dropping all outgoing non-IP data traffic responsive to an output MAC ACL;
electing said another ring device as a new ring master device of said ring topology, wherein said new ring master device is blocking a ring port coupled to said failure;
temporarily disabling MAC address learning on said pair of ring ports of said ring master communication switch, in response to said receiving said multicast message and also, in response, bidirectionally flooding data transmitted by said ring master communication switch onto said ring topology using both of said pair of ring ports of said ring master communication switch; and
flushing MAC addresses learned prior to said failure after disabling MAC address learning.

14. The ring master communication switch of claim 13, wherein said method further comprises:

receiving at still another ring device of said ring topology said multicast message from said another ring device;

relaying said multicast message to a next device from said still another ring device; and temporarily disabling MAC address learning on a pair of ring ports of said still another ring device, in response to receiving said multicast message and also, in response, bidirectionally flooding data transmitted by said still another ring device onto said ring topology using both of said pair of ring ports of said still another ring device.

15. The ring master communication switch of claim 13, wherein a next device is said ring master communication switch.

16. The ring master communication switch of claim 13, wherein said changing said ring port to said forwarding state is performed at a hardware interrupt level of said ring port.

17. A system comprising:
means for receiving at a communication switch of a ring network a multicast message regarding a failure in said ring topology from another ring device including at least one of a pair of ring devices proximate said failure;
means for changing one of a pair of ring ports of said communication switch of said ring topology from a blocking state to a forwarding state, in response to receiving said multicast message wherein said blocking state comprises procedures for: dropping all incoming data traffic, dropping all outgoing IP data traffic responsive to an output IP ACL and dropping all outgoing non-IP data traffic responsive to an output MAC ACL and changing comprises invalidating said blocking state procedures;
means for electing one of said pair of proximate ring devices as a new ring master of said ring network, said new ring master blocking a ring port coupled to said failure; and
means for temporarily disabling MAC address learning on said pair of ring ports of said communication switch independent of MAC address purging, in response to receiving said multicast message and also, in response, bidirectionally flooding data transmitted by said communication switch onto said ring topology using both of said pair of ring ports of said communication switch.

18. The system of claim 17, further comprising:
still another ring device of said ring network receiving said multicast message from said another ring device;
means for relaying said multicast message to a next ring device from said still another ring device; and
means for temporarily disabling MAC address learning on a pair of ring ports of said still another ring device, in response to receiving said multicast message and also, in response, bidirectionally flooding data transmitted by said still another ring device onto said ring topology using both of said pair of ring ports of said still another ring device.

19. The system of claim 17, wherein said means for changing said ring port to said forwarding state is performed at a hardware interrupt level of said ring port.

20. A method comprising:
detecting a failure in a ring network;
transmitting a multicast message across said ring network comprising information about said failure;
changing one of a pair of ring ports of a first communication switch of said ring network from a blocking state to a forwarding state, in response to receiving said multicast message wherein changing said blocking state to said forwarding state comprises invalidating procedures for: dropping all incoming data traffic, dropping all outgoing IP data traffic responsive to an output IP ACL and dropping all outgoing non-IP data traffic responsive to an output MAC ACL;

determining that a second communication switch is a new ring master of said ring network, said second communication switch blocking a ring port coupled to said failure;

temporarily disabling a MAC address learning process of said ring ports of said first communication switch independent of deleting MAC addresses in a background process, in response to said receiving said multicast message and also, in response, bidirectionally flooding data transmitted by said first device onto said ring network using both of said pair of ring ports of said first communication switch.

21. The method as described in claim 20, further comprising:

said second communication switch being determined to be said new ring master by independently electing itself over another ring device from a pair of ring devices proximate said failure.

22. The method as described in claim 20, further comprising:

initiating a background process for deleting MAC addresses, in response to said receiving said multicast message.

23. The method as described in claim 22, further comprising:

enabling a MAC address learning process for said ring port after said background process is complete.

24. The method as described in claim 20, further comprising:

a first ring port of a third communication switch receiving said multicast message, said first ring port forwarding said multicast message to a second ring port of said third communication switch and sending a copy of said multicast message to a processor of said third communication switch.

25. A method comprising:

detecting a failure of a link in a ring network that includes a group of nodes, said link failure disrupting communications between at least two of said nodes of said ring network;

transmitting a multicast message across said ring network to said group of nodes including one of said nodes that is currently designated as an existing ring master for said ring network, said multicast message comprises information about said link failure;

temporarily disabling a MAC address learning process of each node of said group of nodes independent of deleting MAC addresses of said nodes in a background process, in response to said receiving said multicast message;

identifying ones of said group of nodes that are directly adjacent to said existing ring master node in said ring network;

designating one of said identified nodes as a new ring master, wherein said designation occurs preemptively and independently of whether said link failure is to be resolved;

blocking a ring port of said new ring master, said blocked port being one that is associated with said link failure, wherein said blocking comprises: dropping all incoming data traffic, dropping all outgoing IP (Internet Protocol) data traffic responsive to an output IP ACL (Access Control List) and dropping all outgoing non-IP data traffic responsive to an output MAC ACL;

wherein said preemptive designation of one of said directly adjacent nodes as said new ring master, combined with said blocking of said ring port on said new ring master, prevents repeated data circling during failure recovery; and switching said blocking to forwarding by invalidating procedures for: dropping all incoming data traffic, dropping all outgoing IP (Internet Protocol) data traffic responsive to an output IP ACL and dropping all outgoing non-IP data traffic responsive to an output MAC ACL.

* * * * *

UNITED STATES PATENT AND TRADEMARK OFFICE
CERTIFICATE OF CORRECTION

PATENT NO. : 7,688,716 B2  
APPLICATION NO. : 11/120668  
DATED : March 30, 2010  
INVENTOR(S) : Moni Pande et al.

Page 1 of 1

It is certified that error appears in the above-identified patent and that said Letters Patent is hereby corrected as shown below:

Column 13, line 28 (Claim 12): Delete "VLANS" and insert -- VLANs --, therefor.

Signed and Sealed this
Twenty-fifth Day of January, 2011

David J. Kappos
*Director of the United States Patent and Trademark Office*